Dec. 1, 1964  E. G. BIANCA  3,159,293
TRUCK FOR PARKING VEHICLES
Filed Aug. 15, 1962  8 Sheets-Sheet 1

INVENTOR.
Edoardo Giuseppe Bianca
BY

Dec. 1, 1964 E. G. BIANCA 3,159,293
TRUCK FOR PARKING VEHICLES
Filed Aug. 15, 1962 8 Sheets-Sheet 2

INVENTOR.
Edoardo Giuseppe Bianca
BY

Dec. 1, 1964   E. G. BIANCA   3,159,293
TRUCK FOR PARKING VEHICLES
Filed Aug. 15, 1962   8 Sheets-Sheet 4

INVENTOR.
Edoardo Giuseppe Bianca
BY

Dec. 1, 1964  E. G. BIANCA  3,159,293
TRUCK FOR PARKING VEHICLES
Filed Aug. 15, 1962  8 Sheets-Sheet 6

INVENTOR.
*Edoardo Giuseppe Bianca*
BY

INVENTOR.
Edoardo Giuseppe Bianca

United States Patent Office 3,159,293
Patented Dec. 1, 1964

3,159,293
TRUCK FOR PARKING VEHICLES
Edoardo Giuseppe Bianca, Rosenweg 11, Zollikon,
Zurich, Switzerland
Filed Aug. 15, 1962, Ser. No. 217,113
Claims priority, application Austria Aug. 18, 1961
12 Claims. (Cl. 214—333)

The present invention relates to a truck for conveying wheeled vehicles, especially in parking garages, and to an installation for parking vehicles including such a truck.

Various mechanical parking systems with conveying trucks for the shifting of vehicles for example into a transport cabin and thence to a storage space are already known. Most possess a conveying truck which is pushed beneath the vehicle to be shifted and between the wheels thereof, whereupon any gripper elements are pushed out or pivoted out, which mostly engage on the tyres of the vehicle and either push the vehicle directly or lift it and then entrain it. These systems possess a series of technical difficulties, in that on the one hand (on account of the low ground clearance of the vehicles) a very flat construction is necessary and on the other hand the construction of the mechanism is rendered very difficult by the given ratio between truck width and the widest vehicle and the spacing between the tyres of the narrowest vehicle. Consequently the known embodiments in this sphere are very complicated and require much space; they are expensive in production and in operation and mostly also require external propulsion by means of winch, cable and pertinent auxiliary arrangements. These circumstances thus also have hitherto opposed use of mechanical parking on a wide scale.

The present invention has the purpose to avoid the described disadvantages and difficulties to obtain a reduction of the production and operation costs and an increased operational reliability, so that the practical use of the mechanical parking system is placed upon an economic basis.

The main feature of the conveying truck according to the invention, which possesses gripping elements which can be pushed out on both sides and are actuated by pinions and racks for the grasping of the wheels of wheeled vehicles, consists in that the racks are pivotable about a drive shaft arranged in the longitudinal direction of the truck, on which shaft there are secured the pinions which drive the racks. Thus the drive shaft constitutes the pivoting centre.

The racks are expediently connected with a pivot bearing rotatable about the shaft, the pivot bearing consisting of parts in the form of bearing bushes which are retained on the shaft by means of an external ring. The racks associated with one pair of wheels are here advantageously in engagement in pairs with one common pinion, on opposite sides thereof, and the pivot bearing parts of the racks associated with the same pinion are rotatable on the drive shaft independently of one another, that is to say in opposite directions.

Each rack is expediently connected with its pivot bearing by means of a sliding guide, the sliding guide being possibly formed from a tongue-shaped part of the pivot bearing and flange-shaped parts of the rack arranged laterally thereof.

The gripper elements for the grasping of the wheels of the wheeled vehicles to be shifted consist advantageously of fork-shaped parts connected with the racks. These gripper elements are raised and lowered about the drive shaft as centre by special lifting or pivoting elements which engage on the end of the rack or on the root of the gripper elements. Thus these lifting or pivoting elements control the pivoting path of the racks and the rising and lowering travel of the gripper elements.

The pivot bearings rotatable about the drive shaft provided in accordance with the invention, which are equipped with sliding guides, thus fulfill the double function of the guidance of the racks and of the pivotal mounting of these parts, and take up the reaction forces.

A further essential feature of the invention consists in that the pushing out and the raising or lowering and drawing in of the gripper elements is effected by one single drive mechanism with mechanical automatic sequence system. For this purpose there is provided a motor-driven reciprocating chain, by which both the drive shaft and the lifting or pivoting elements are driven. With the movement of the chain in one direction there are coupled one after the other the pushing out of the racks and the lifting of the gripper elements and in the other direction one after the other the lowering of the lifting elements and the withdrawal of the racks.

According to a preferred form of embodiment of this drive principle, the chain is connected with a crank which carries a roller which engages in the guide slot of a mobile slide, which is movable in turn on a guide rail arranged at right-angles to the guide slot, a cable or chain being secured to the reciprocating slide for the drive of the drive shaft. A locking arrangement actuated by the roller of the crank can here be provided on the slide, holding the slide fast in the position corresponding to the pushed-out position of the gripper elements, the roller of the crank leaving the guide slot after locking and rotating freely further and in the return of the crank unlocking the said locking arrangement on return into the guide slot.

The reciprocating movement of the chain can be effected in a simple manner by reversal of the drive motor.

The above-mentioned special lifting and pivoting elements can consist of axial cams connected with chain wheels, lifting rollers which are connected with the roots of the gripper elements running on the axial cams; the chain wheels are again driven through the common chain.

For the control of the phases of movement in accordance with the invention the axial cams have a plane part and a rising part, the ratio of which to one another is so dimensioned that during the push-out and lifting phase of the movement of the drive chain the rising part comes into action, as soon as the crank leaves the slide after termination of the pushing out movement of the shaft, and that during the lowering and withdrawal phase of the movement of the chain the operation takes place in the inverse direction and sequence.

Since as a result of the compact style of construction of the conveying truck in accordance with the invention the length of the end of the conveying truck facing the rear wheels of a vehicle to be shifted, measured from the middle of the front wheels, is shorter than the minimum wheel base, the channel—if one is used—does not extend into the region of the rear wheels of the vehicle. In this manner the centering of a vehicle to be shifted is very simple. In accordance with the invention centering arrangements are provided for the wheels of the vehicle which are grasped by the conveying truck and for the wheels not grasped by the conveying truck, the latter lying outside the area of the conveying truck in the reception position. The centering arrangement for the wheels not grasped by the conveying truck is here expediently formed by a base movable as a whole and a pair of thrust elements acting on the wheels from the interior outwards, and the centering arrangement for the wheels to be grasped by the conveying truck is formed by a low-friction base formed by rollers disposed obliquely to the vehicle axis, and thrust elements acting upon the wheels. Due to the centering arrangement acting from the interior for the wheels of the vehicle not grasped by the conveying truck, maximum possible security is obtained and endangering of persons, occuring frequency in the case of the known inverse arrangement, is reliably avoided.

The invention will be explained in greater detail hereinafter with reference to a preferred embodiment shown in the accompanying drawings, wherein.

Figure 1:
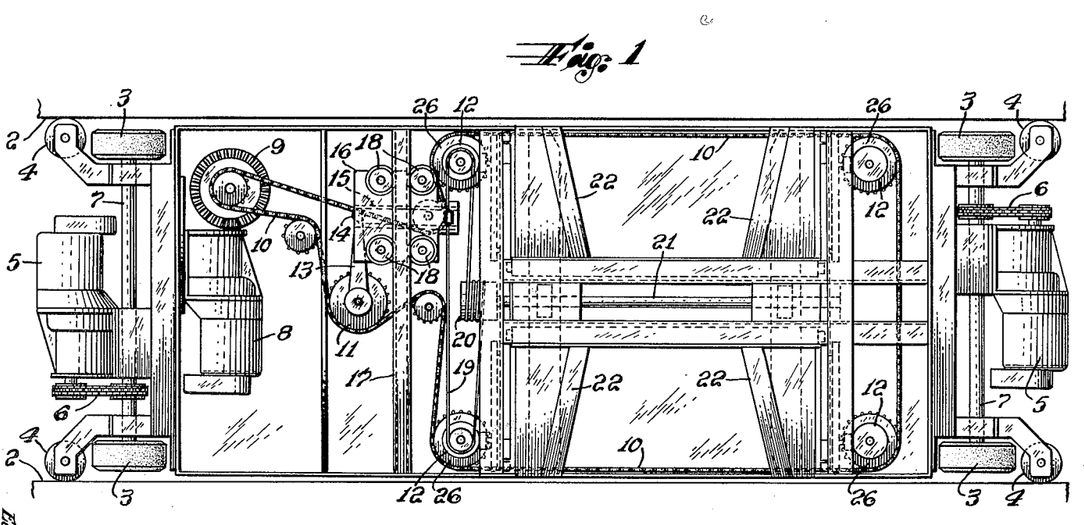
FIGURE 1 shows a parking truck of the invention in plan view.
Figure 2:
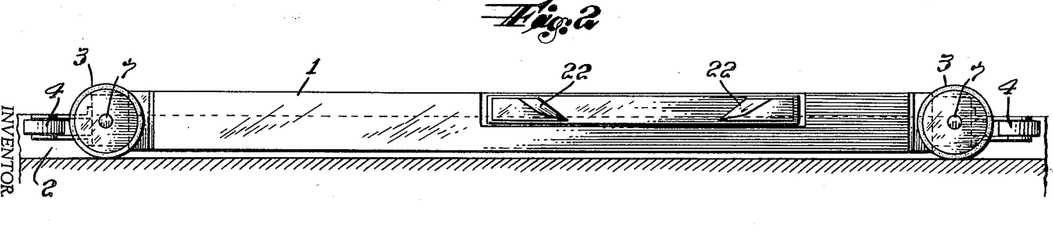
FIGURE 2 is a lateral elevation of the truck of FIG. 1.

In FIGURES 1 and 2, there is illustrated a conveying truck guided in a sunken channel. However such a channel is not needed if the conveying truck is made very low, for example, of a height of 14 to 20 cm. 1 designates the frame of the conveying truck, 2 the channel and 3 the wheels of the conveying truck, 4 are the guide wheels of the conveying truck and 5 designates the drive motors and the gearing of the truck. These motors drive the wheel axles 7 through the chain drive 6.

On the frame of the conveying truck there is arranged a motor 8, which drives a chain 10 through a reduction gearing and the angle drive 9, which chain in turn is in constant engagement with the chain wheel 11 and the chain wheels 26. The chain wheel 11 is connected with a crank drive 13 and the chain wheels 26 are connected with the lifting elements in a manner to be described more precisely hereinafter.

Due to the drive of the chain 10 by the motor 8 the crank 13 is rotated; the crank 13 carries a roller 14 which engages in a guide slot 15 of the slide 16 mobile on wheels 18 and moves this slide along the rail 17. The slide 16 through the cable and drum 20 drives a drive shaft 21 arranged in the longitudinal direction of the conveying truck, this movement being used for the pushing out of the gripper elements 22. At the same time the chain 10 also rotates the chain wheels 26 connected with the lifting elements; these lifting elements however run idly during the pushing out and lift the roots of the fork-shaped gripper elements through rollers and levers only after termination of the pushing-out movement, and pivot them upwards about the drive shaft as centre.

Figure 3:
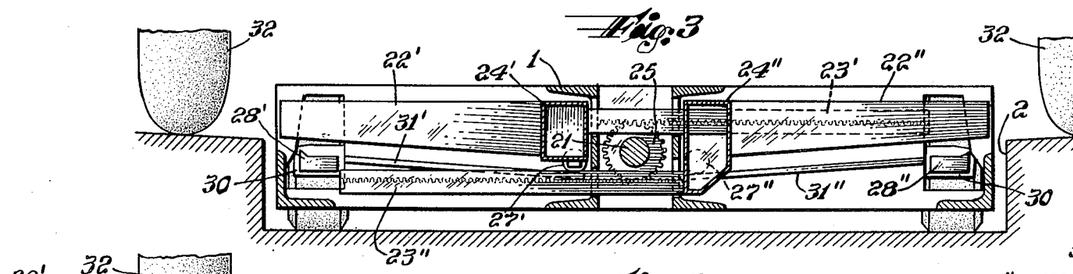
FIGURES 3, 4 and 5 respectively show withdrawn, pushed-out and lifted gripper elements of the truck of FIG. 1 in front elevational section.
Figures 4, 5:
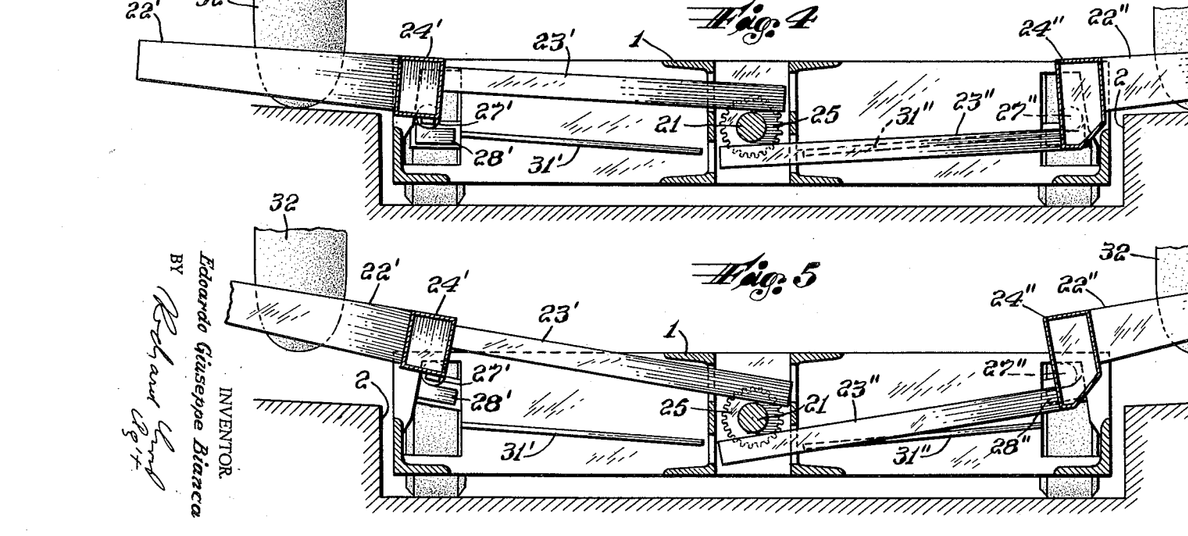

The details of this pivoting movement are represented in FIGURES 3 to 5. In FIGURE 3 the left and right gripper forks 22' and 22" with their root beams 24' and 24" are illustrated in the withdrawn state. The gripper forks are connected with racks 23' at the top and 23" at the bottom. The racks are in engagement with the pinion 25 on the shaft 21 and in this position are situated on the sides opposite to the gripper forks, the rack 23' being situated in the interior of the hollow fork 22".

By the rotation of the shaft 21 the racks 23', 23" and thus the forks 22', 22' are pushed out in opposite directions into the position according to FIGURE 4. The rollers or pins 27', 27" secured on the root beams 24', 24" have here run over the guides 31', 31" on to the noses 28', 28", and the gripper elements 22 have pushed laterally beneath the vehicles wheels 32.

FIGURE 5 shows how by lifting of the noses 28', 28" connected through a lever and roller with the lifting cam 12 the root beams 24 and thus the forks 22', 22" are pivoted upwards and thus the vehicle wheels 32 are grasped and lifted.

Figure 6:
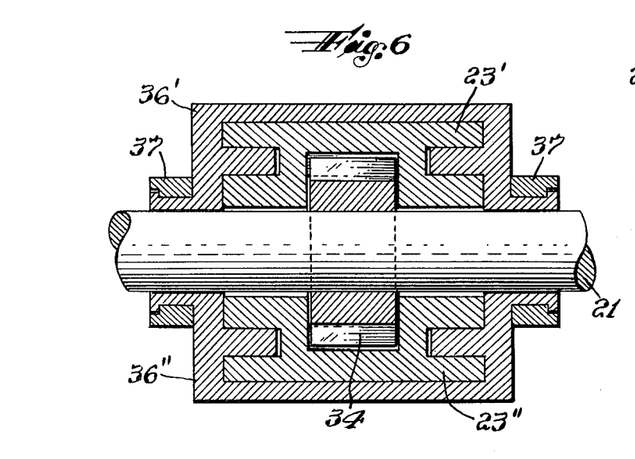
FIGURE 6 shows sliding guides for racks of the same truck, in longitudinal section.
Figure 7:
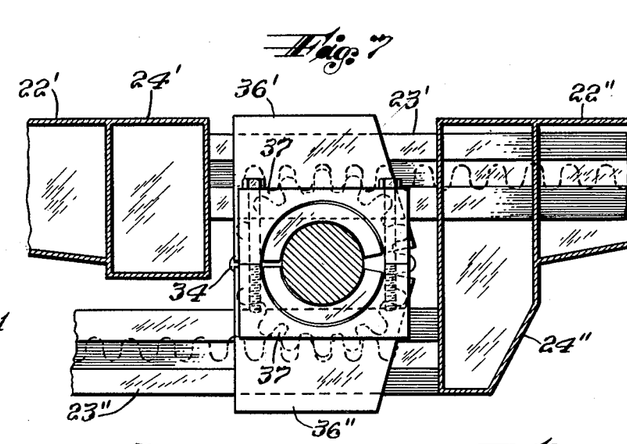
FIGURE 7 shows a sliding guide in cross-section with withdrawn gripper elements.
Figure 8:
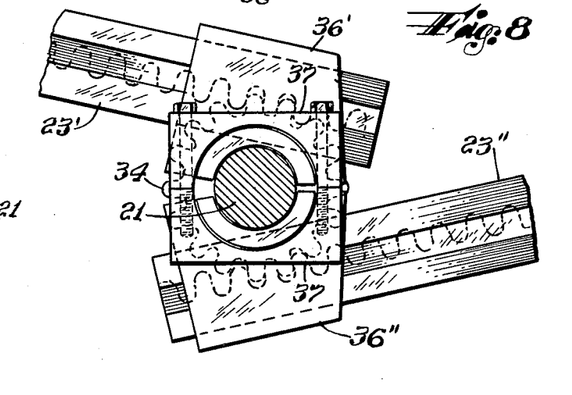
FIGURE 8 shows a sliding guide in cross-section with pushed-out and lifted gripper elements.

FIGURE 6 shows in longitudinal section, FIGURES 7 and 8 in cross-section, the construction of the slide bearings. The racks 23', 23", made of H-shaped profile, are guided by tongues of slide guides 36', 36" which conformingly engage the H-profile. The racks can slide freely laterally of the truck but are held at a fixed radial distance from the shaft 21 in engagement with pinion 34. The peripheral contact surface of each slide guide amounts to as much less than 180° as is necessary for the desired relative pivotal movement of the guides 36' and 36". The guides 36', 36" are held together and in contact with the shaft 21 by rings 37 (of divided construction).

Figure 9:
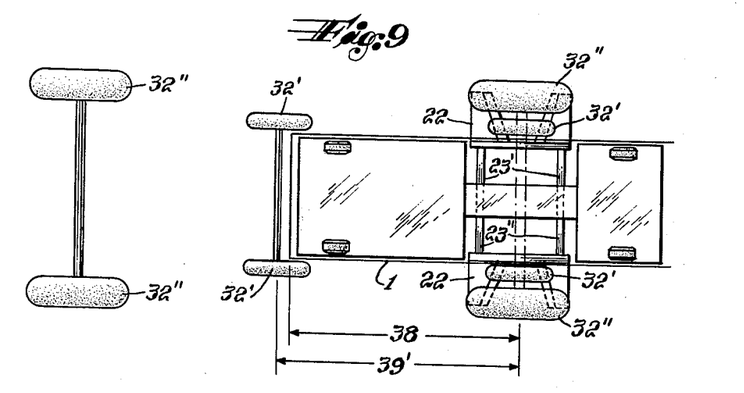
FIGURE 9 shows the arrangement of the truck in relation to a vehicle to be shifted, in plan view, FIGURES 10 and 11 respectively are front elevational and side-elevational views of the arrangement of the gripper elements in realtion to the vehicle wheels in the pushed-out state of the gripper elements.

FIGURE 9 shows the position and the outline of the conveying truck 1 in relation to a vehicle to be shifted. The fork-shaped gripper elements 22 grasp the front wheels of the vehicle, 32' designating the wheels of the smallest and 32" those of the largest vehicle for which the conveying truck is intended. The distance 38 from the centre of the gripper elements to the end of the conveying truck 1 adjacent the other pair of vehicle wheels is less than the distance between the wheels 32' of the smallest vehicle.

Figure 10:
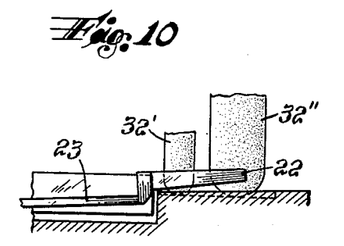
Figure 11:
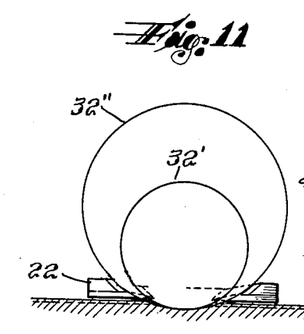
Figure 12:
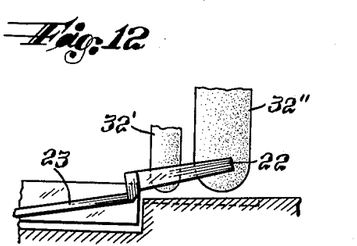
FIGURES 12 and 13 are corresponding representations of the gripper elements in the lifted state.
Figure 13:
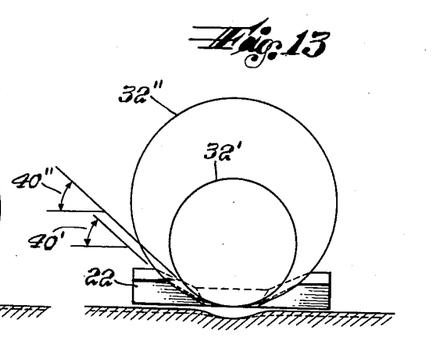

FIGURES 10 and 11 show the fork-shaped gripper elements 22 in the pushed-out state in relation to the wheels 32' and 32" of the smallest and largest vehicle. The fork lies closely or with slight clearance on the wheel 32', but is so spread apart that it has a greater clearance in relation to the wheel 32". On pivoting up of the gripper element 22 about the drive shaft 21 in the case of the wheel 32" a greater travel occurs as a result of the greater distance from the drive shaft. This difference is however taken up according to FIGURES 12 and 13 when the stroke has taken place, by the greater initial clearance on the wheel 32", so that an equal useful stroke occurs. Thus the fork 22 grasps the larger wheel 32" at a higher point than the smaller whele 32', so that the object is achieved that the tangent angles 40' and 40" remain constant despite difference of the wheel diameters. Due to the points of action at different heights the disadvantage pertaining to the known systems (with gripping points at the same height) is avoided, namely that the large vehicles easily jump out of the forks on acceleration or braking.

Figure 14:
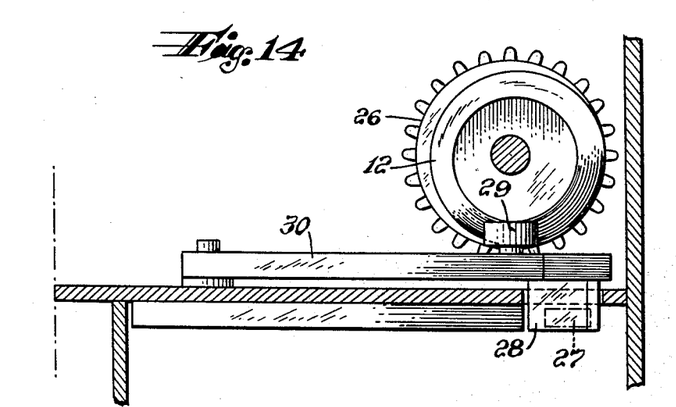
FIGURE 14 is a plan view of the elements which transmit lifting movement from a lifting roller on a lifting cam to the gripper elements.
Figure 15:
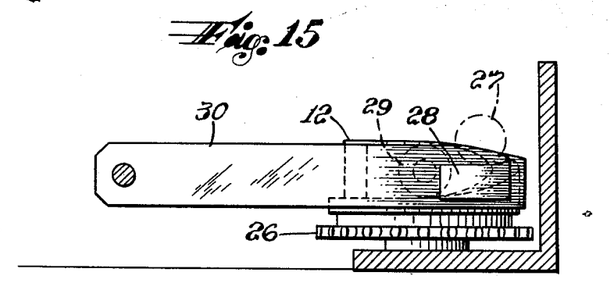
FIGURES 15 and 16 show the device of FIG. 14 in two operational positions, in elevation.
Figure 16:
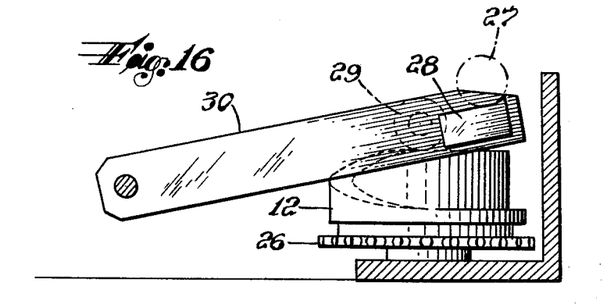

In FIGURES 14, 15 and 16 there is illustrated by way of example how a roller 29 running on the lifting cam 12 transmits the lifting force through a pivoting lever 30 to the nose 28, whence it is conducted again through the roller 27 which has run on to the nose 28 during pushing out, to the root beams 24 of the gripper elements 22 (FIGURES 3 to 5).

Figure 18:
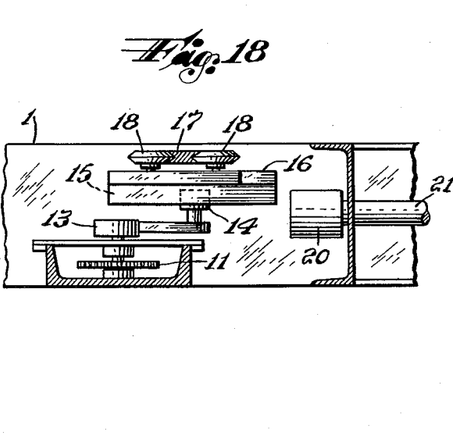
FIGURE 18 shows a slide for pushing the gripper elements out, and its actuating mechanism, the view being in cross section.

FIGURE 18 shows in longitudinal section the arrangement of the guide rail 17 of the slide 16, and of the chain wheel 11 of the crank 13, as illustrated in FIGURE 1.

Figure 17:
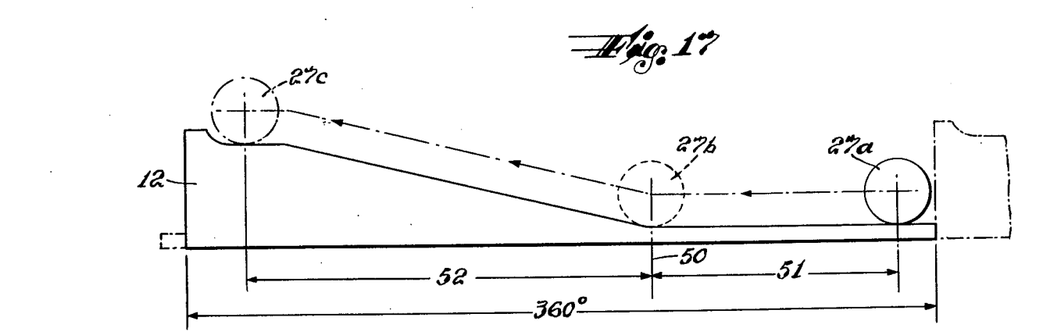
FIGURE 17 shows a developed profile of the lifting cam.
Figures 19, 20, 21, 22, 23, 24:
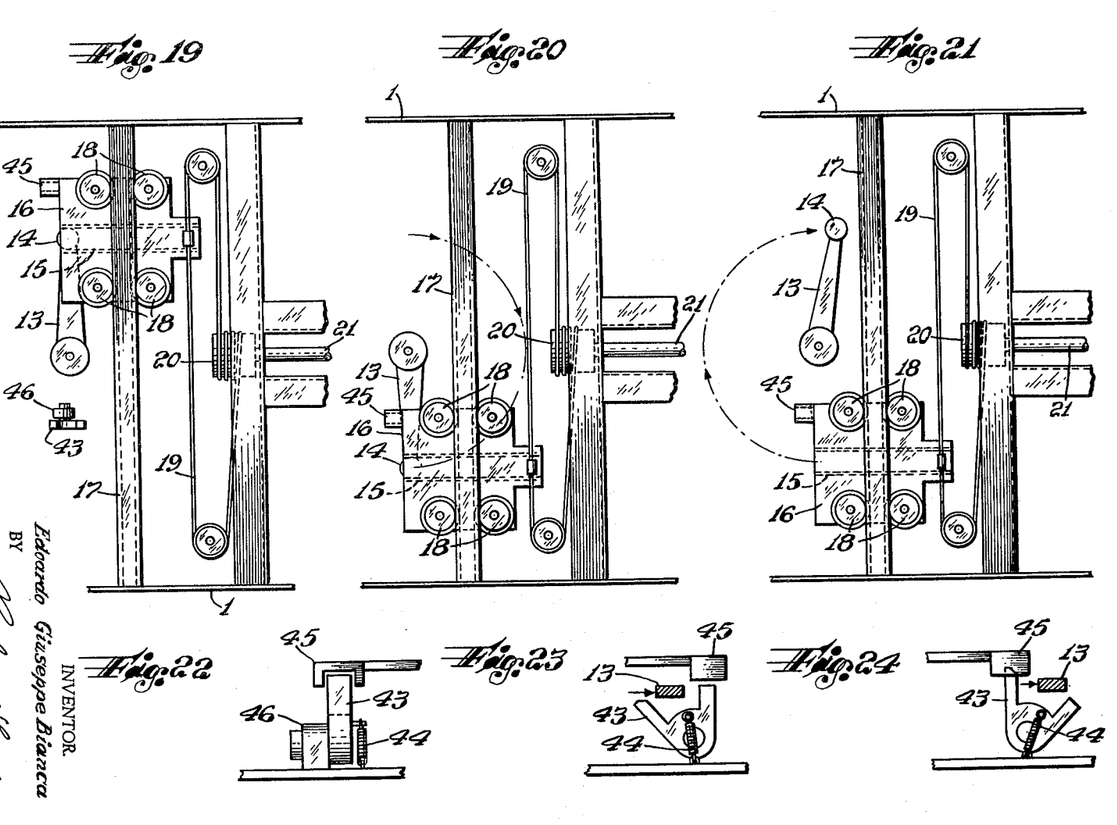
FIGURES 19, 20 and 21 are plan views of the apparatus of FIG. 18 in three operational positions.
FIGURES 22, 23 and 24 show the locking arrangement for the slide in front-elevational section and in side elevation.

In FIGURES 19 to 21 there are illustrated the various kinematic phases of the push-out -lifting (or lowering-retracting) movement. FIGURE 19 shows the crank 13 and the slide 16 in the position corresponding to the completely withdrawn lifting forks. At the same time this corresponds to the position 27a of the roller 27 on the lifting cam 12 (FIGURE 17).

By drive of the chain 10 in one direction now the crank 13 and the lifting cams 12 are rotated at the same time. FIGURE 20 shows the position after approximately one half rotation of the crank 13. The slide 16 is situated in the other end position and has pushed out the forks completely by means of the cable 19, the drum 20 and the shaft 21. The slide 16 is now held fast in this position by a locking arrangement including a bolt 43 (FIGURES 22 to 24) which is actuated by the crank 13, according to FIGURE 24. The spring 44 holds the bolt fast in the locking position. At the same time the rollers 27 on the lifting cam 12 have rolled by the distance 51 into the position 27b.

The continuing drive of the chain 10 rotates the crank 13 again through about one half revolution, but idly; the push-out mechanism remains locked and at the same time the rollers 27 run on the cams by the second component distance 52 up the rise into the lifting end position 27c. FIGURE 21 shows the corresponding position of the crank 13.

For lowering and retracting the gripper elements 22, the motor 8 driving reversed. The rollers 27 run back by the distance 52, lower the gripper elements and, when they reach the phase change point 50, the roller 14 of the crank 13 re-enters the guide slot 15; the crank 13 pivots the bolt 43 and unlocks the slide 16 (FIGURE 20). The lifting forks are now lowered; on further running of the chain 10 the roller 27 runs over the plane part of the cam 12 into the position 27a, and the slide and the push-out mechanism return into the initial position (FIGURE 19).

Figure 25:
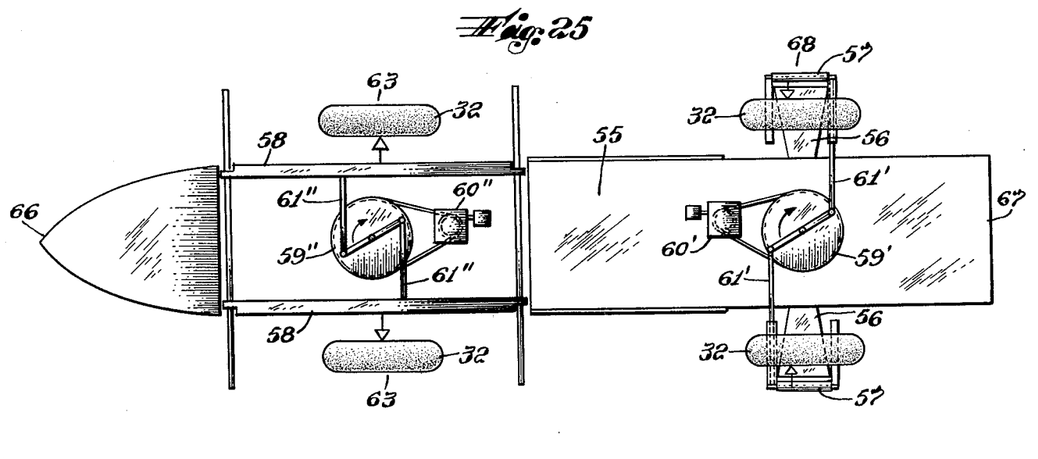
FIGURE 25 illustrates a centering arrangement for a vehicle to be received on the truck of FIG. 1, in plan view.
Figure 26:
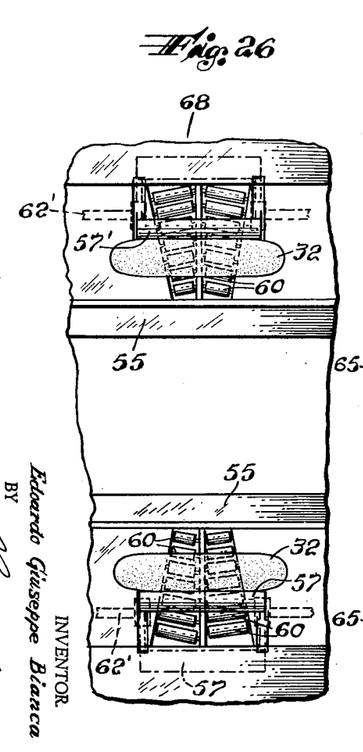
FIGURES 26 and 27 show in plan view and in vertical section details of the centering arrangement of FIG. 25, and FIGURES 28 and 29 show additional details of the centering arrangement in elevational section.
Figure 27:
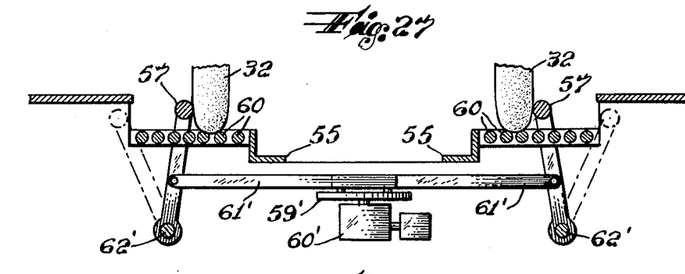

FIGURE 25 shows a centering arrangement which is advantageous in combination with the described conveying truck. 66 is the entry side of the vehicles, 67 the conveying shaft and 55 the channel (which may be present), which according to FIGURE 9 does not extend as far as the rear wheels of the vehicle. 56 designates low-friction roller bases (see also FIGURES 26 and 27) with the rollers 60, which are set at an angle to the direction of travel (preferably about 10–15°). The rollers at the same time form a flat V-shaped notch, in order to hold the front wheels of the vehicle in the fixed position 68. The press keys 57, which are connected contrarily through a linkage 61' to a crank disc 59', centre the wheels 32 in positive synchronous contrary running, by means of a setting drive 60'. Due to the oblique position of the rollers they are held fast in the centred position by the small friction component thereby occurring. The section according to FIGURE 27 shows the wheels in the centred position.

Figure 28:
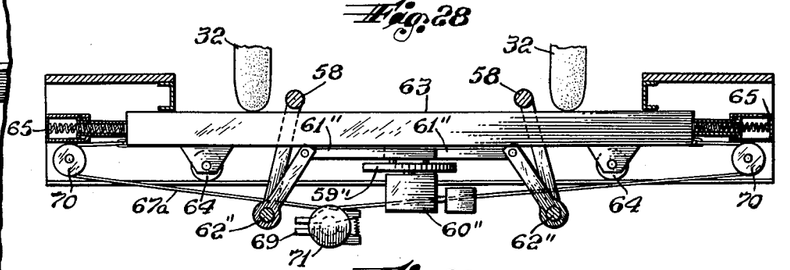
Figure 29:
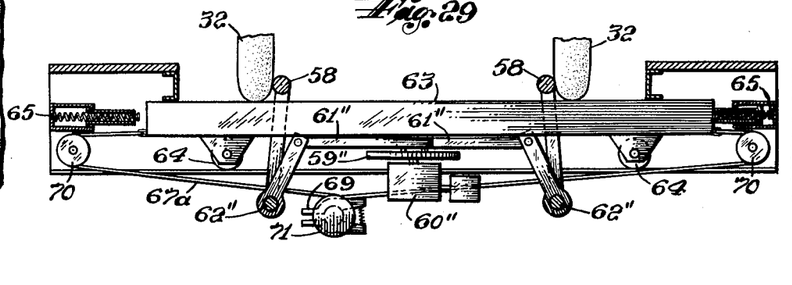

The centering of the rear wheels requires a certain range of length, corresponding to the difference between maximum and minimum wheel base. It may be seen in FIGURE 25 on the left from the greater length of the presser elements 58, which according to the section in FIGURES 28 and 29 move from the interior outwards (FIGURE 28 before and FIGURE 29 after the centering). The synchronous positive drive 60'', 50'' and 61'' acts upon levers which are mounted on the shafts 62'', which in turn move the presser elements 58 through levers. The low friction base is a rolling floor 63, resting on rollers 64 and held normally in the central position by initially tensioned, stroke-limited springs 65. It is further connected through a contrarily moving cable 67a with reversing rollers 70 with a cable drum 71, and the latter with a magnet brake 69. In the centering operation the presser elements 58 are pressed in positive opposed motion against the tyres 32 by the drive 60'' through 59'', 61'', 62'', until the centering has taken place with displacement of the rolling floor 63. The floor is held fast in this position by the magnetic brake 69 and the presser elements return into the initial position. After the vehicle is shifted by the conveying truck, the magnetic brake is disengaged and the rolling floor returns also into its central initial position under the pressure of the springs 65.

The afore-described truck is operated as follows:

The conveying truck is positioned between the wheels and beneath the vehicle to be parked. The front wheels of the vehicle are grasped and lifted by the gripper elements which are pushed out and pivoted by the racks. Thereupon the conveying truck is driven by its motors 5, taking the vehicle with it, while the rear wheels thereof roll freely. At the storage place the front wheels are set down by lowering and withdrawing the gripper elements, and the truck is returned into its initial position. The afore-described centering arrangement longitudinally aligns the vehicle with the conveying truck prior to loading. Although the conveying truck maintains its direction of movement without guidance, a guide channel may be provided for the truck, so that vehicles having very low ground clearance, such as 70 to 75 mm. may be parked. In this case the centering arrangement for the rear wheels of the vehicle may be formed by a floor plate movable laterally as a unit.

Because of the compact and simple drive elements of the truck of the invention both pairs of wheels of a vehicle may be grasped and lifted by two of the trucks arranged in tandem. The spacing of the trucks from one another is adjusted to the wheel base of the vehicle by means of a known feeler-controlled servo-mechanism.

It is also possible to lift only the rear wheels of the vehicle to be shifted if suitable measures are taken to prevent pivoting of the front wheels during travel. The wheels of narrow-track vehicles may be restrained by abutment against elements of the conveying truck, and the wheels of wide track vehicles may be held in line by appropriately dimensioned wheel edges of the tracks in the elevator cabin and in storage compartments. In this manner the wheels of the narrow track vehicles can be guided from the interior, and those of wide track vehicles from the exterior.

What I claim is:
1. A truck arrangement comprising, in combination:
  (a) a frame;
  (b) a drive shaft rotatable on said frame about a normally horizontal axis;
  (c) a pinion mounted on said drive shaft for rotation therewith;
  (d) two elongated rack members simultaneously meshing with said pinion for simultaneous longitudinal movement in opposite directions when said pinion rotates;
  (e) a wheel gripping element mounted on each rack member for movement therewith between a retracted and a projecting position; and
  (f) lifting means on said frame for pivoting each of said rack members about the axis of said drive shaft.

2. An arrangement as set forth in claim 1, further comprising two guide members rotatably mounted on said shaft, said rack members being mounted on said guide members respectively for longitudinal movement relative to the associated guide member, and for rotation therewith about said axis.

3. An arrangement as set forth in claim 1, wherein at least one of said gripping elements is hollow, and a portion of the rack member having the other gripper element mounted thereon being received in said one gripper element when said gripper elements are in the retracted positions thereof.

4. An arrangement as set forth in claim 1, wherein each wheel gripping element has an inner portion secured to a respective rack member, and an outer portion spaced from said inner portion in a direction away from said axis, said outer portion being forked.

5. An arrangement as set forth in claim 1, further comprising common drive means connected to said drive shaft and to said lifting means for actuating the same in timed sequence.

6. An arrangement as set forth in claim 5, wherein said drive means are reversible for moving said gripper elements toward said projected position thereof and pivoting the same upward with the associated rack member when the drive means moves in one direction, and for moving said gripper elements toward said retracted position and pivoting the same downward with the associated rack member when the drive means moves in the other direction.

7. An arrangement as set forth in claim 5, wherein said drive means include a motor, and motion transmission means interposed between said motor, said drive shaft, and said lifting means for selectively actuating pivoting of said rack members by said lifting means when said wheel gripping elements are in the projecting position thereof.

8. An arrangement as set forth in claim 7, further comprising locking means for selectively locking said gripping elements in said projecting position thereof while the associated rack members are being pivoted by said lifting means.

9. An arrangement as set forth in claim 1, wherein said lifting means include a cam member movable on said frame and roller means engaging said cam member and secured to one of said rack members.

10. An arrangement as set forth in claim 1, wherein said lifting means include a cam member rotatable on said frame about a vertical axis, and roller means on each of said rack members and simultaneously engaging said cam member during the rotation thereof.

11. A truck arrangement comprising, in combination:
(a) a frame;
(b) a drive shaft rotatable on said frame about a normally horizontal axis;
(c) pinion means mounted on said drive shaft for rotation therewith;
(d) rack means mounted on said shaft for pivoting movement about the same, and engaging said pinion means for movement toward and away from said axis when said drive shaft rotates;
(e) lifting means for actuating pivotal movement of said rack means on said drive shaft; and
(f) a wheel gripping element movably mounted on said frame and operatively connected to said rack means for movement therewith, said wheel gripping element moving between a projecting position and a retracted position relative to said frame when said rack means moves toward and away from said axis, and said wheel gripping element moving vertically when said rack means moves pivotally about said drive shaft.

12. A truck arrangement as set forth in claim 11, wherein respective portions of said rack means and of said wheel gripping element are fixedly connected, and said lifting means engage one of said portions for actuating said pivotal movement of said rack means.

References Cited in the file of this patent

UNITED STATES PATENTS 2,890,802     Alimanestiano  ---------- June 16, 1959

FOREIGN PATENTS 825,213     Great Britain  ------------ Dec. 9, 1959
1,078,757    Germany  --------------- Mar. 31, 1960